United States Patent
Zhang (10) Patent No.: US 8,462,846 B2
(45) Date of Patent: Jun. 11, 2013

(54) VIDEO ENCODER AND METHOD FOR PERFORMING INTRA-PREDICTION AND VIDEO DATA COMPRESSION

(75) Inventor: Kai Zhang, Beijing (CN)

(73) Assignee: Mediatek Singapore Pte. Ltd., Ayer Rajah Crescent (SG)

( * ) Notice: Subject to any disclaimer, the term of this patent is extended or adjusted under 35 U.S.C. 154(b) by 0 days.

(21) Appl. No.: 13/005,321

(22) Filed: Jan. 12, 2011

(65) Prior Publication Data

US 2011/0110425 A1 May 12, 2011

Related U.S. Application Data (63) Continuation of application No. 12/623,635, filed on Nov. 23, 2009.

(60) Provisional application No. 61/223,113, filed on Jul. 6, 2009.

(30) Foreign Application Priority Data

Sep. 25, 2009 (CN) .......................... 2009 1 0177838

(51) Int. Cl.
*H04N 7/12* (2006.01)
*H04N 11/02* (2006.01)
*H04N 11/04* (2006.01)

(52) U.S. Cl.
USPC ............ 375/240.12; 375/240.13; 375/240.14; 382/238; 348/394.1; 348/409.1; 348/411.1

(58) Field of Classification Search
USPC ................ 375/240.01–240.29; 382/236, 238; 348/394.1, 409.1, 411.1
See application file for complete search history.

(56) References Cited

U.S. PATENT DOCUMENTS

| | | | |
|---|---|---|---|
| 7,187,798 B1 | 3/2007 | Payton | |
| 7,266,149 B2 | 9/2007 | Holcomb et al. | |
| 8,218,640 B2 | 7/2012 | Wang | |
| 8,290,041 B2 | 10/2012 | Suzuki et al. | |
| 2003/0231795 A1* | 12/2003 | Karczewicz | 382/238 |
| 2008/0084929 A1* | 4/2008 | Li | 375/240.12 |
| 2008/0175319 A1* | 7/2008 | Sun et al. | 375/240.12 |
| 2010/0166327 A1* | 7/2010 | Goel | 382/236 |
| 2010/0208802 A1* | 8/2010 | Tsukuba et al. | 375/240.12 |

OTHER PUBLICATIONS

De Oliveira, R.G., et al.; "A Novel Weighted Cross Prediction for H.264 Intra Coding;" IEEE International Conference on Multimedia and Expo; Jul. 2009; pp. 805-808.

* cited by examiner

*Primary Examiner* — Sath V Perungavoor
*Assistant Examiner* — Nathnael Aynalem
(74) *Attorney, Agent, or Firm* — McClure, Qualey & Rodack, LLP (57) ABSTRACT

The invention provides a method for performing intra-prediction. A target pixel is selected from a plurality of pixels of a current block. A first intra-prediction mode of a left block and a second intra-prediction mode of an up block are then determined. A first prediction value of the target pixel is calculated according to the first intra-prediction mode. A second prediction value of the target pixel is calculated according to the second intra-prediction mode. The first prediction value and the second prediction value are then weighted-averaged to obtain a weighted-average prediction value as an intra-prediction value of the target pixel.

28 Claims, 8 Drawing Sheets

| Pixel Position \ Intra-Prediction Mode | (0,0) | (0,1) | (0,2) | (0,3) | (1,0) | ... | (3,3) |
|---|---|---|---|---|---|---|---|
| Mode 0 | $w_1^0(0,0)$, $w_2^0(0,0)$, $w_3^0(0,0)$ | $w_1^0(0,1)$, $w_2^0(0,1)$, $w_3^0(0,1)$ | $w_1^0(0,2)$, $w_2^0(0,2)$, $w_3^0(0,2)$ | $w_1^0(0,3)$, $w_2^0(0,3)$, $w_3^0(0,3)$ | $w_1^0(1,0)$, $w_2^0(1,0)$, $w_3^0(1,0)$ | ... | $w_1^0(3,3)$, $w_2^0(3,3)$, $w_3^0(3,3)$ |
| Mode 1 | $w_1^1(0,0)$, $w_2^1(0,0)$, $w_3^1(0,0)$ | $w_1^1(0,1)$, $w_2^1(0,1)$, $w_3^1(0,1)$ | $w_1^1(0,2)$, $w_2^1(0,2)$, $w_3^1(0,2)$ | $w_1^1(0,3)$, $w_2^1(0,3)$, $w_3^1(0,3)$ | $w_1^1(1,0)$, $w_2^1(1,0)$, $w_3^1(1,0)$ | ... | $w_1^1(3,3)$, $w_2^1(3,3)$, $w_3^1(3,3)$ |
| Mode 2 | $w_1^2(0,0)$, $w_2^2(0,0)$, $w_3^2(0,0)$ | $w_1^2(0,1)$, $w_2^2(0,1)$, $w_3^2(0,1)$ | $w_1^2(0,2)$, $w_2^2(0,2)$, $w_3^2(0,2)$ | $w_1^2(0,3)$, $w_2^2(0,3)$, $w_3^2(0,3)$ | $w_1^2(1,0)$, $w_2^2(1,0)$, $w_3^2(1,0)$ | ... | $w_1^2(3,3)$, $w_2^2(3,3)$, $w_3^2(3,3)$ |
| ... | ... | ... | ... | ... | ... | ... | ... |
| Mode 8 | $w_1^8(0,0)$, $w_2^8(0,0)$, $w_3^8(0,0)$ | $w_1^8(0,1)$, $w_2^8(0,1)$, $w_3^8(0,1)$ | $w_1^8(0,2)$, $w_2^8(0,2)$, $w_3^8(0,2)$ | $w_1^8(0,3)$, $w_2^8(0,3)$, $w_3^8(0,3)$ | $w_1^8(1,0)$, $w_2^8(1,0)$, $w_3^8(1,0)$ | ... | $w_1^8(3,3)$, $w_2^8(3,3)$, $w_3^8(3,3)$ |

| Intra-Prediction Mode / Variance Level | Mode 0 | Mode 1 | Mode 2 | ... | Mode 8 |
|---|---|---|---|---|---|
| Variance Level A | $C_{0A}$ | $C_{1A}$ | $C_{2A}$ | ... | $C_{8A}$ |
| Variance Level B | $C_{0B}$ | $C_{1B}$ | $C_{2B}$ | ... | $C_{8B}$ |
| Variance Level C | $C_{0C}$ | $C_{1C}$ | $C_{2C}$ | ... | $C_{8C}$ |

FIG. 7

VIDEO ENCODER AND METHOD FOR PERFORMING INTRA-PREDICTION AND VIDEO DATA COMPRESSION

CROSS REFERENCE TO RELATED APPLICATIONS

This application is a Continuation of application Ser. No. 12/623,635, filed Nov. 23, 2009, which claims the benefit of U.S. Provisional Application No. 61/223,113, filed on Jul. 6, 2009, and claims the priority of China Patent Application No. 200910177838.7, filed on Sep. 25, 2009, the entirety of which are incorporated by reference herein.

BACKGROUND OF THE INVENTION

1. Field of the Invention

The invention relates to video processing, and more particularly to video encoding.

2. Description of the Related Art

Video data comprises a series of frames, wherein each frame is a picture and is divided into a plurality of blocks to be respectively encoded. A video block may be encoded in an intra-mode or an inter-mode. In the intra-mode, pixels of a video block are compared with pixels of neighboring blocks to reduce the data amount to be encoded. In the inter-mode, pixels of a video block of a current frame are compared with pixels of a corresponding block of a reference frame to reduce the data amount to be encoded.

Figure 1A:
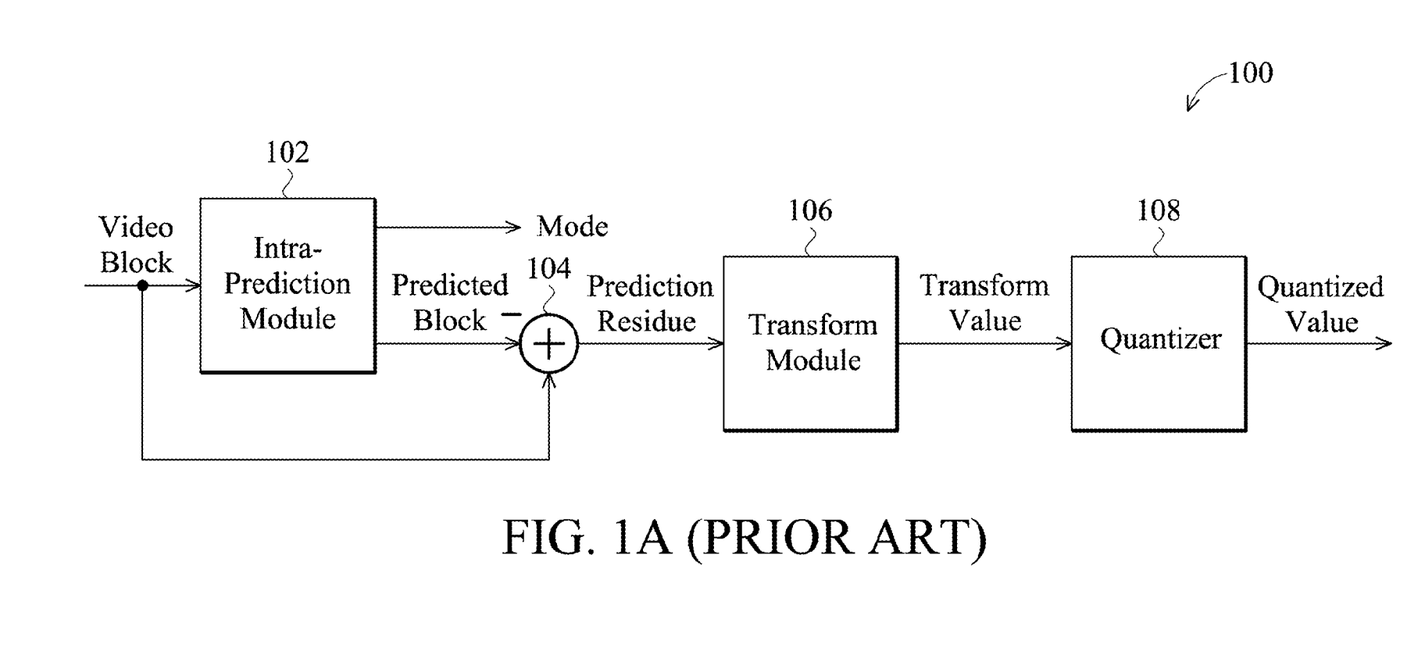
FIG. 1A is a block diagram of a video encoder encoding video data according to an intra-mode.
Figure 2:
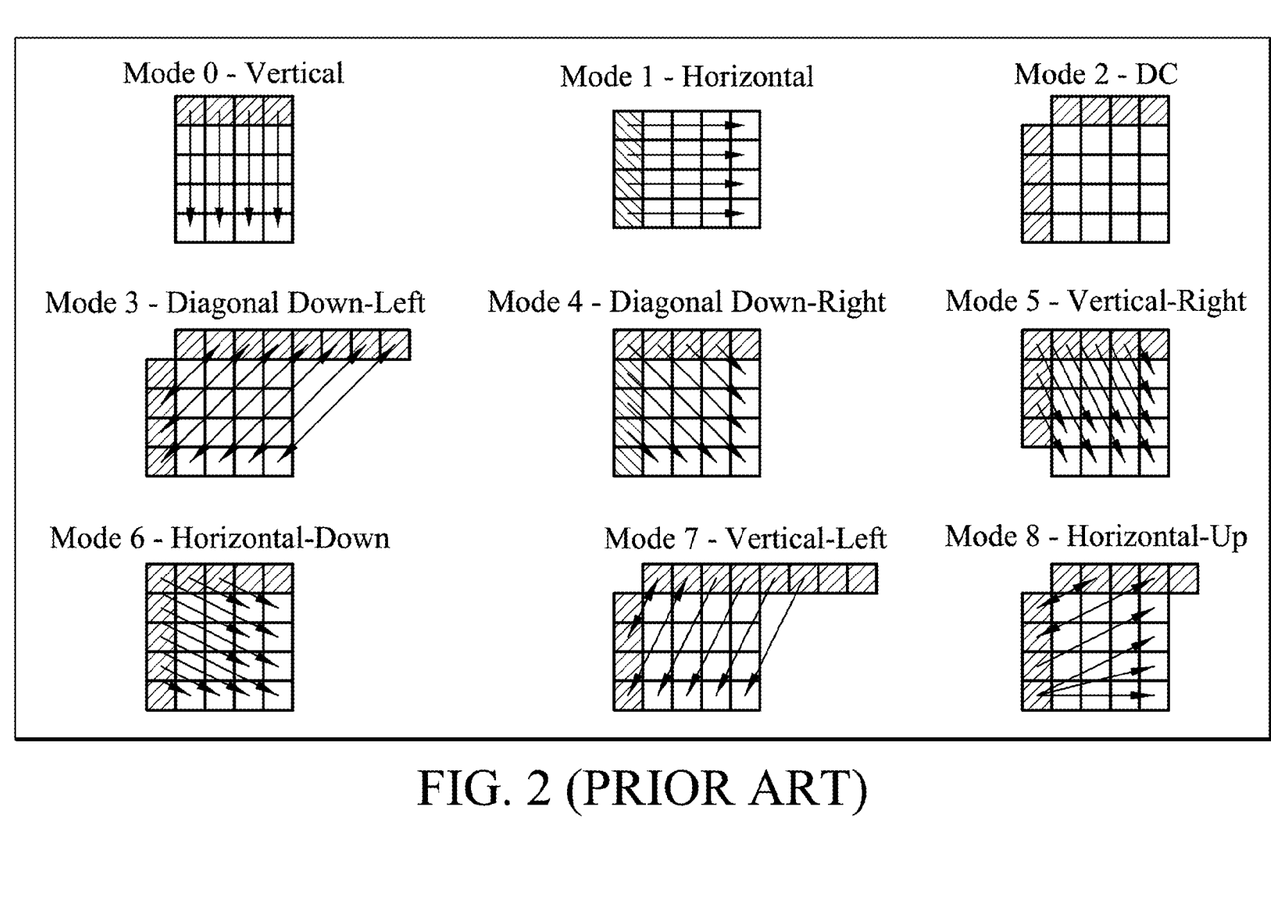
FIG. 2 is a schematic diagram of nine intra-prediction modes 0-8 according to the VCEG-N54 standard.

Referring to FIG. 1A, a block diagram of a video encoder 100 encoding video data according to an intra-mode is shown. The video encoder 100 comprises an intra-prediction module 102, a subtraction module 104, a transform module 106, and a quantizer 108. A video block is first delivered to the intra-prediction module 102. The intra-prediction module 102 performs intra-prediction to generate a predicted block according to pixels of blocks neighboring to the video block. The intra-prediction module 102 performs intra-prediction according to one of a plurality of intra-prediction modes. FIG. 2 is a schematic diagram of nine intra-prediction modes 0-8 according to the VCEG-N54 standard. Each intra-prediction mode generates pixel values of a predicted block according to different neighboring pixels. The subtraction module 104 then subtracts pixel values of the predicted block from pixel values of the video block to obtain prediction residues of pixels of the video block. The transform module 106 then performs video data compression to convert the prediction residues of the video block to transform values with reduced data amount. For example, the transform module 106 may perform discrete cosine transform (DCT) or Karhunen-Loeve transform (KLT) on the prediction residues to obtain the transform values. The quantizer 108 then quantizes the transform values to quantized values with further reduced data amount suitable for storage or transmission.

Figure 1B:
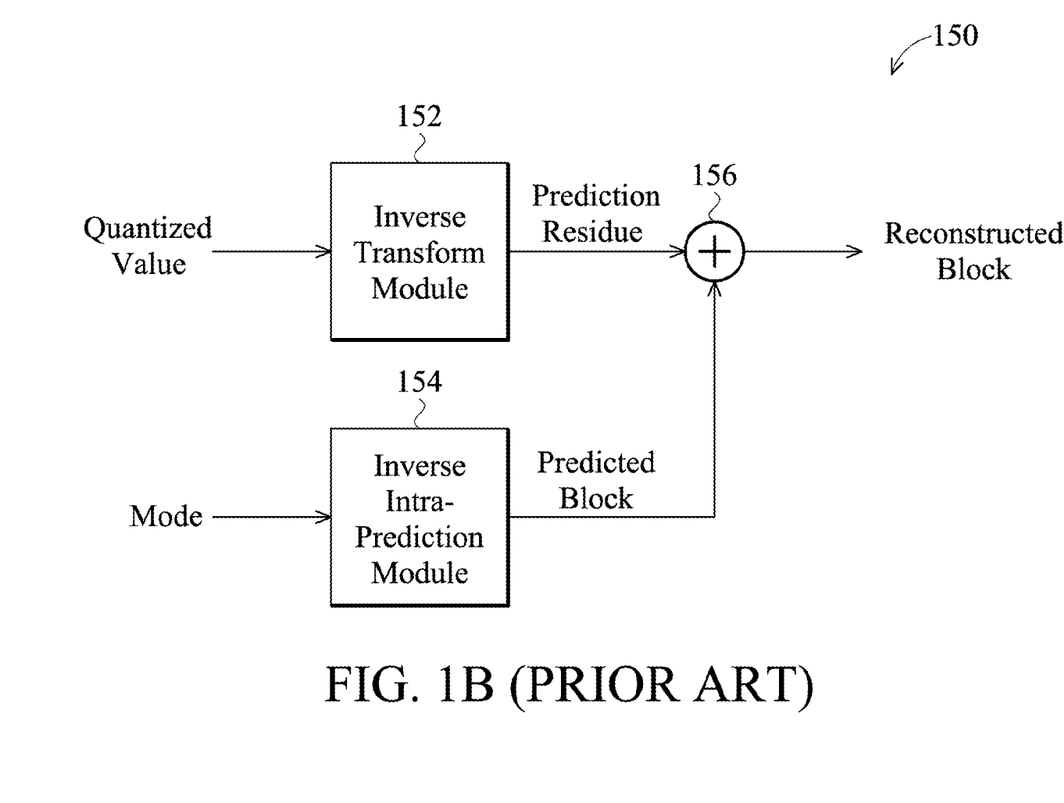
FIG. 1B is a block diagram of a video decoder decoding video data according to an intra-mode.

Referring to FIG. 1B, a block diagram of a video decoder 150 decoding video data according to an intra-mode is shown. In one embodiment, the video decoder 150 comprises an inverse transform module 152, an inverse intra-prediction module 154, and a summation module 156. The inverse transform module 152 performs video data decompression to convert quantized values of the video block to prediction residues. The inverse intra-prediction module 154 performs intra-prediction according to an intra-prediction mode to generate a predicted block. The summation module 156 then adds the prediction residues to the predicted block to obtain a reconstructed block. The reconstructed block is then output for display.

The video encoder 100 shown in FIG. 1A, however, has shortcomings First, when intra-prediction is performed, the intra-prediction module 102 generates a predicted block corresponding to a current block according to pixel values of neighboring blocks. Pixel values of the predicted block are therefore related to pixel values of the neighboring blocks. Intra-prediction modes corresponding to the neighboring blocks and the current block, however, are independently determined. The predicted blocks corresponding to the neighboring blocks and the current blocks therefore are often generated according to different intra-prediction modes, leading to discontinuous change in predicted block values corresponding to the neighboring blocks and the current blocks. A method for performing intra-prediction on a current block according to intra-prediction modes of neighboring blocks is therefore required. In addition, the transform module 106 performs video data compression according to only one set of transform coefficients. Intra-prediction residues obtained according to different intra-prediction modes, however, require different transform coefficients to best suit properties of the different intra-prediction modes. A method for performing video data compression according to different transform coefficients corresponding to different intra-prediction modes is therefore required.

BRIEF SUMMARY OF THE INVENTION

The invention provides a method for performing intra-prediction. First, a first intra-prediction mode of a left block and a second intra-prediction mode of an up block are determined, wherein the left block is on the left of the current block, and the up block is on top of the current block. A target pixel is then selected from a plurality of pixels of the current block. A first prediction value of the target pixel is then calculated according to the first intra-prediction mode. A second prediction value of the target pixel is then calculated according to the second intra-prediction mode. The first prediction value and the second prediction value are then weighted-averaged to obtain a weighted-average prediction value. Finally, an intra-prediction value of the target pixel is derived from the weighted-average prediction value.

The invention also provides a video encoder. In one embodiment, the video encoder receives a current block, wherein a left block is on the left of the current block and an up block is on top of the current block. In one embodiment, the video encoder comprises an intra-prediction module and a subtraction module. The intra-prediction module selects a target pixel from a plurality of pixels of the current block, determines a first intra-prediction mode of the left block and a second intra-prediction mode of the up block, calculates a first prediction value of the target pixel according to the first intra-prediction mode, calculates a second prediction value of the target pixel according to the second intra-prediction mode, and weighted-averages the first prediction value and the second prediction value to obtain a weighted-average prediction value as a prediction value of the target pixel. The subtraction module subtracts the prediction value from the target pixel to obtain a prediction residue of the target pixel.

The invention provides a method for performing intra-prediction. First, a first intra-prediction mode of a left block and a third intra-prediction mode of a current block are determined, wherein the left block is on the left of the current block. A target pixel is then selected from a plurality of pixels of the current block. A first prediction value of the target pixel is then calculated according to the first intra-prediction mode. A third prediction value of the target pixel is then calculated according to the third intra-prediction mode. The first prediction value and the third prediction value are then weighted-averaged to obtain a weighted-average prediction value. Finally, an intra-prediction value of the target pixel is derived from the weighted-average prediction value.

The invention also provides a video encoder. In one embodiment, the video encoder receives a current block, wherein a left block is on the left of the current block. In one embodiment, the video encoder comprises an intra-prediction module and a subtraction module. The intra-prediction module selects a target pixel from a plurality of pixels of the current block, determines a first intra-prediction mode of the left block and a third intra-prediction mode of the current block, calculates a first prediction value of the target pixel according to the first intra-prediction mode, calculates a third prediction value of the target pixel according to the third intra-prediction mode, and weighted-averages the first prediction value and the third prediction value to obtain a weighted-average prediction value as a prediction value of the target pixel. The subtraction module subtracts the prediction value from the target pixel to obtain a prediction residue of the target pixel.

The invention provides a method for performing intra-prediction. First, a second intra-prediction mode of an up block and a third intra-prediction mode of a current block are determined, wherein the up block is on top of the current block. A target pixel is then selected from a plurality of pixels of the current block. A second prediction value of the target pixel is then calculated according to the second intra-prediction mode. A third prediction value of the target pixel is then calculated according to the third intra-prediction mode. The second prediction value and the third prediction value are then weighted-averaged to obtain a weighted-average prediction value. Finally, an intra-prediction value of the target pixel is derived from the weighted-average prediction value.

The invention also provides a video encoder. In one embodiment, the video encoder receives a current block, wherein an up block is on top of the current block. In one embodiment, the video encoder comprises an intra-prediction module and a subtraction module. The intra-prediction module selects a target pixel from a plurality of pixels of the current block, determines a second intra-prediction mode of the up block and a third intra-prediction mode of the current block, calculates a second prediction value of the target pixel according to the second intra-prediction mode, calculates a third prediction value of the target pixel according to the third intra-prediction mode, and weighted-averages the second prediction value and the third prediction value to obtain a weighted-average prediction value as a prediction value of the target pixel. The subtraction module subtracts the prediction value from the target pixel to obtain a prediction residue of the target pixel.

A detailed description is given in the following embodiments with reference to the accompanying drawings.

BRIEF DESCRIPTION OF THE DRAWINGS

The invention can be better understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 3:
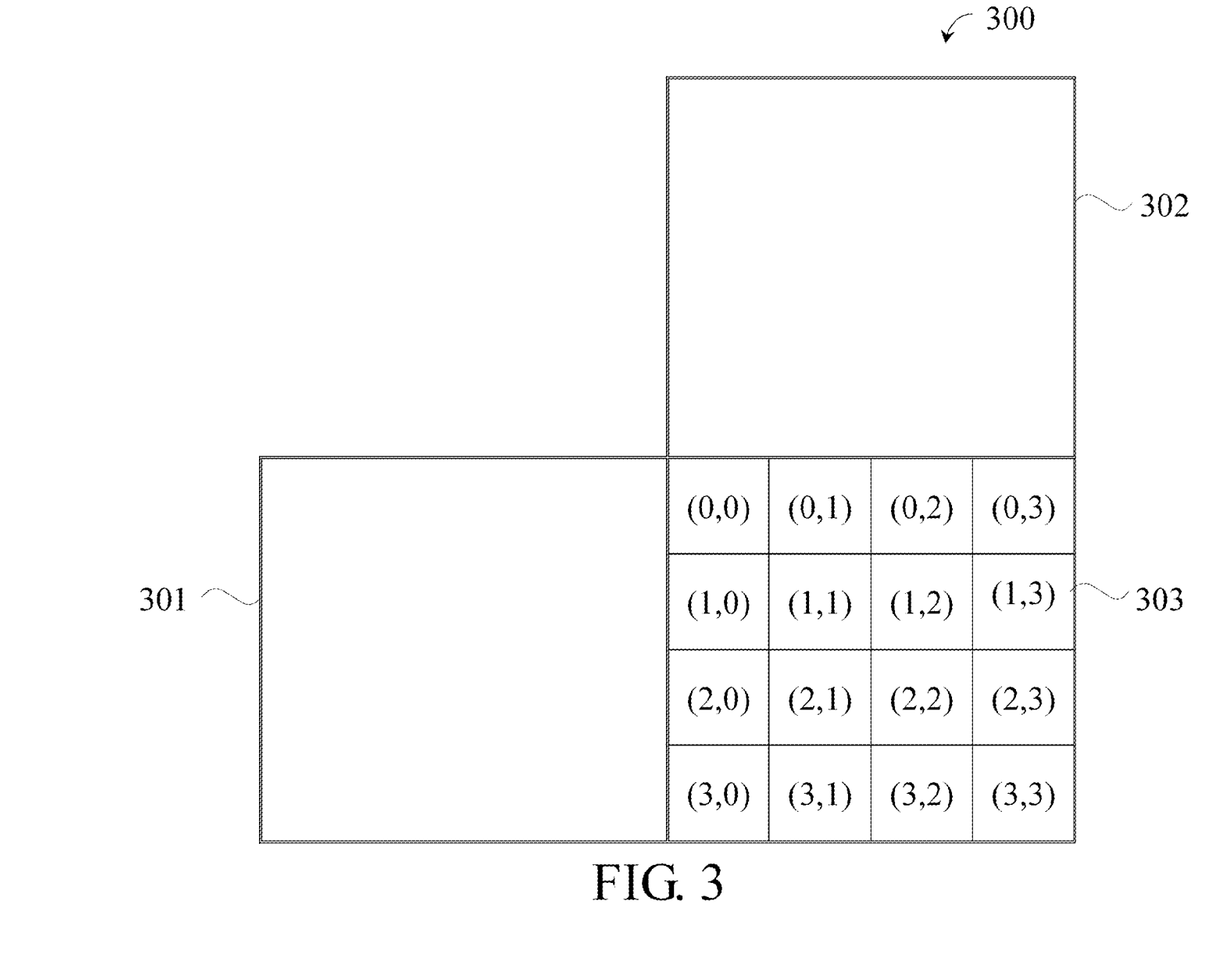
FIG. 3 shows a current block to be processed by an intra-prediction module and two neighboring blocks according to an embodiment of the invention.

Referring to FIG. 3, a schematic diagram of a current block 303 to be processed by an intra-prediction module and two neighboring blocks 301 and 302 according to an embodiment of the invention is shown. The two neighboring blocks comprise a left block 301 and an up block 302. The left block 301, the up block 302, and the current block 303 are in the same frame of video data. The left block is on the left of the current block 303 in the frame. The up block 302 is on top of the current block 303 in the frame. The left block 301, the up block 302, and the current block 303 comprise a predetermined number of pixels, and each pixel has a value indicating a color thereof. In one embodiment, the current block 303 comprises 16 (4×4) pixels with positions of (0, 0)~(3,3).

Figure 4:
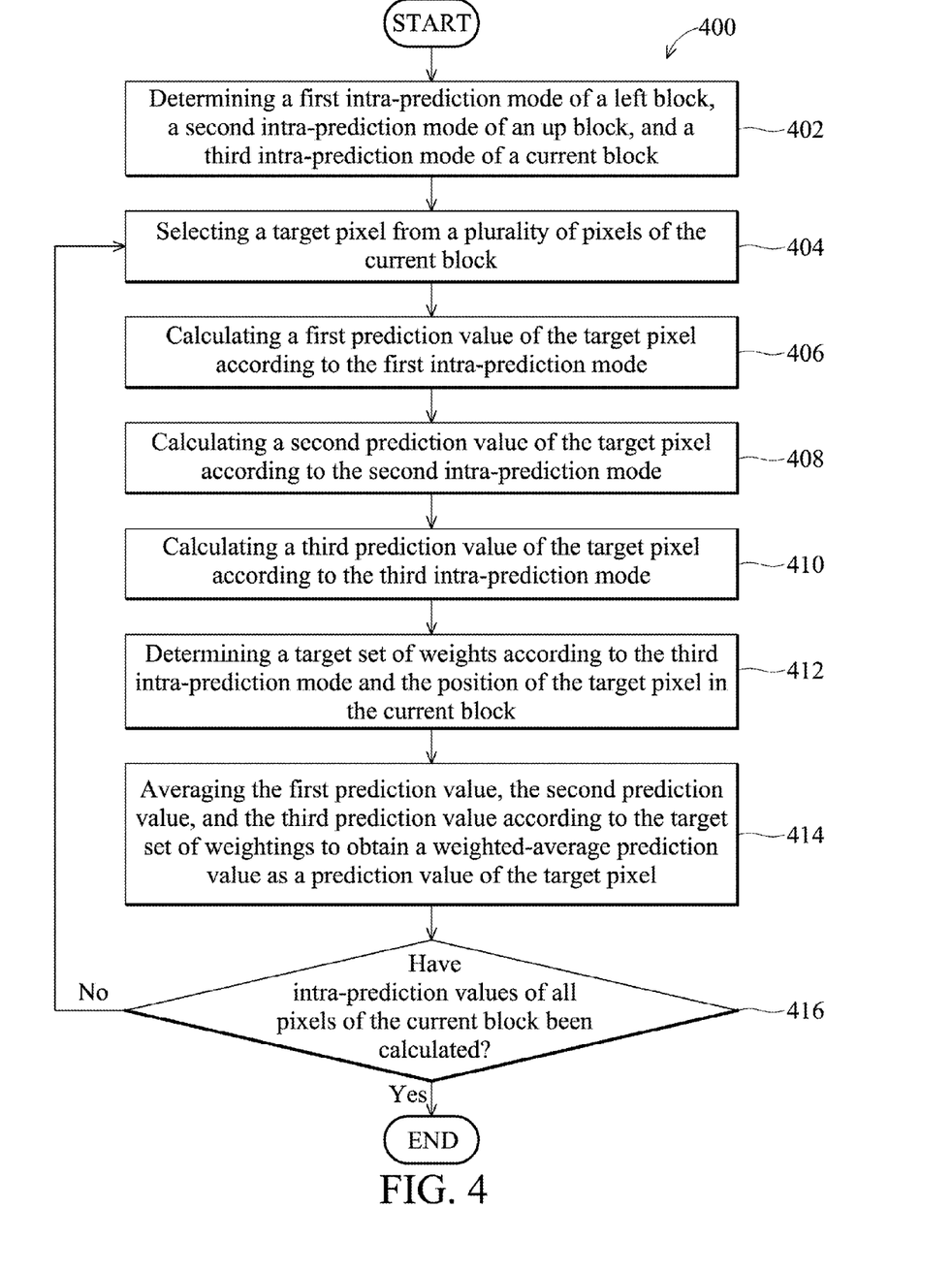
FIG. 4 is a flowchart of a method for performing intra-prediction according to an embodiment of the invention.

Referring to FIG. 4, a flowchart of a method 400 for performing intra-prediction according to an embodiment of the invention is shown. The method of 400 is called overlapped block intra-prediction (OBIP). Assume that an intra-prediction module of a video encoder receives the current block 303 shown in FIG. 3 for intra-prediction. A left block 301 is on the left of the current block 303, and an up block 302 is on top of the current block 303. The intra-prediction modes of the left block 301, the up block 302, and the current block 303 may be different. The intra-prediction module therefore first determines a first intra-prediction mode of the left block 301, a second intra-prediction mode of the up block 302, and a third intra-prediction mode of the current block 303 (step 402).

The current block 303 comprises a plurality of pixels. The intra-prediction module then selects a target pixel from the plurality of pixels of the current block 301 (step 404). The intra-prediction module then calculates a first prediction value $P_1$ of the target pixel according to the first intra-prediction mode of the left block 301 (step 406). The intra-prediction module then calculates a second prediction value $P_2$ of the target pixel according to the second intra-prediction mode of the up block 302 (step 408). The intra-prediction module then calculates a third prediction value $P_3$ of the target pixel according to the third intra-prediction mode of the current block 303 (step 410). Thus, three prediction values $P_1$, $P_2$, and $P_3$ respectively corresponding to the first, second, and third intra-prediction modes are obtained.

Figure 5:
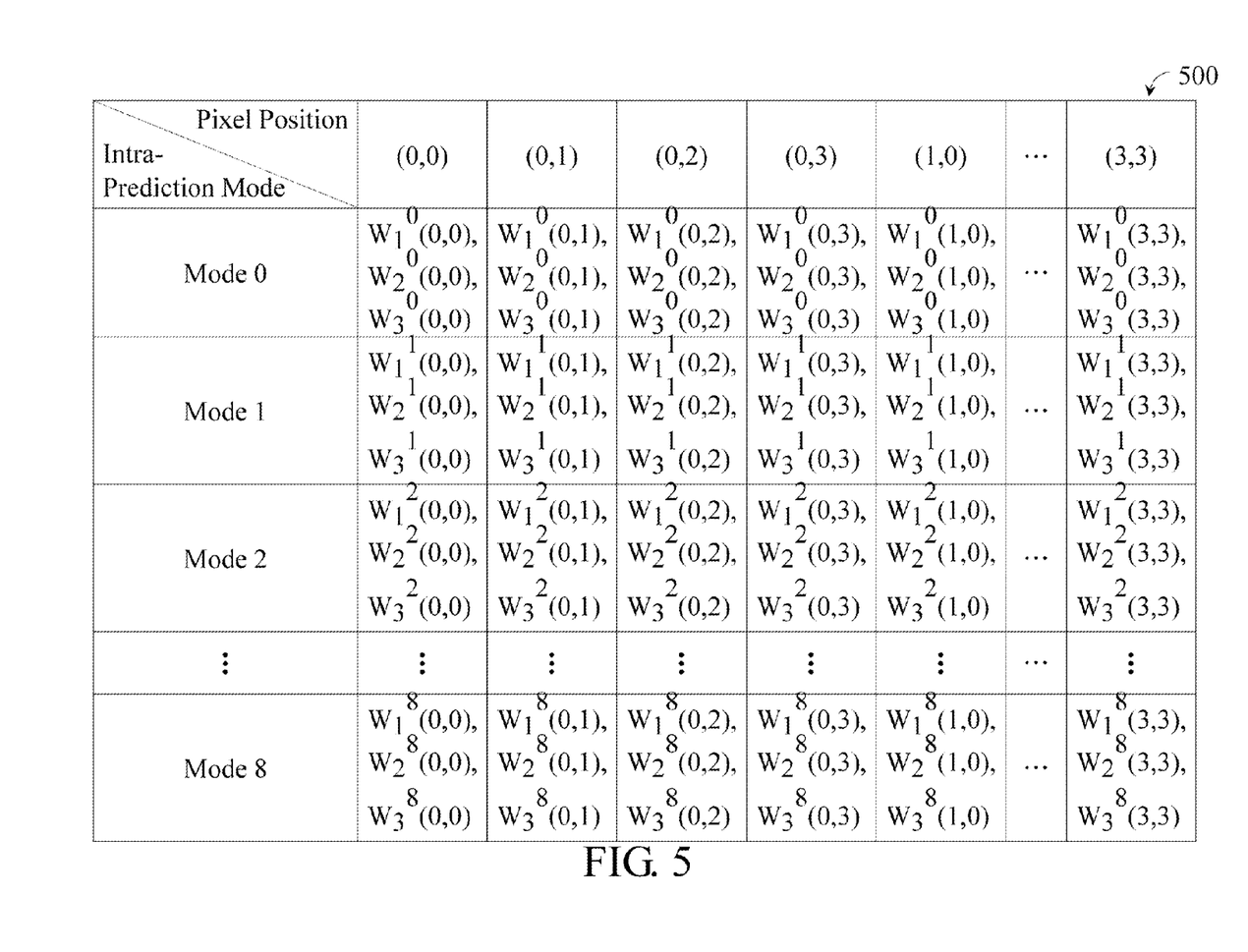
FIG. 5 is a schematic diagram of a weighting table storing a plurality of predetermined weighting sets according to an embodiment of the invention.

The intra-prediction module then averages the three prediction values $P_1$, $P_2$, and $P_3$ to obtain an average value as the prediction value of the target pixel. In this embodiment, the intra-prediction module first determines a target set of weightings $W_1$, $W_2$, and $W_3$ for averaging the three prediction values $P_1$, $P_2$, and $P_3$ (step 412). The sum of the weightings $W_1$, $W_2$, and $W_3$ is equal to 1. The weightings $W_1$, $W_2$, and $W_3$ are determined according to the intra-prediction mode of the current block 303 and the position of the target pixel in the current block. In one embodiment, the intra-prediction module comprises a memory storing a weighting table composed of a plurality of predetermined weighting sets, and the intra-prediction module searches the weighting table for the weightings $W_1$, $W_2$, and $W_3$. Referring to FIG. 5, a schematic diagram of a weighting table 500 is composed of a plurality of predetermined weighting sets according to an embodiment of the invention is shown. The predetermined weighting sets in the weighting table 500 are indexed according to an intra-prediction mode of the current block 303 and a pixel position of the target pixel. In some embodiments, the predetermined weighting sets in the weighting table 500 are determined by an off-line training process using linear regression.

For example, if the target pixel has a location of (0, 2) and the intra-prediction mode of the current block 303 is a vertical mode 0, the weightings $W_1$, $W_2$, and $W_3$ are determined to respectively be $W_1^0(0, 2)$, $W_2^0(0, 2)$, and $W_3^0(0, 2)$. If the target pixel has a location of (3, 3) and the intra-prediction mode of the current block 303 is a horizontal-up mode 8, the weightings $W_1$, $W_2$, and $W_3$ are determined to respectively be $W_1^8(3, 3)$, $W_2^8(3, 3)$, and $W_3^8(3, 3)$. After the weightings $W_1$, $W_2$, and $W_3$ are obtained, the intra-prediction module then averages the first prediction value $P_1$, the second prediction value $P_2$, and the third prediction value $P_3$ according to the weightings $W_1$, $W_2$, and $W_3$ to obtain a weighted-average prediction value $(W_1 \times P_1 + W_2 \times P_2 + W_3 \times P_3)$ as a prediction value of the target pixel (step 414). Calculation of prediction values from the step 404 to the step 414 is continued until prediction values of all pixels of the current block 303 are obtained (step 416). The prediction values of all pixels of the current block 303 are then aggregated to obtain a predicted block and then output to a subtraction module to be subtracted from pixel values of the current block 303, as shown in FIG. 1A. the prediction values of the predicted block are therefore weighted averages of three prediction values $P_1$, $P_2$, and $P_3$ generated according to intra-prediction modes of the left block 301, the up block 302, and the current block 303.

The weightings $W_1$, $W_2$, and $W_3$ for averaging the first prediction value $P_1$, second prediction value $P_2$, and third prediction value $P_3$ are determined according to the intra-prediction mode of the current block 303 at step 412. There are, however, 9 categories of weightings respectively corresponding to 9 intra-prediction modes 0-8 in the weighting table 500, and the weighting sets corresponding to other intra-prediction modes may generate weighted-average prediction values with lower distortion than the weightings determined according to the intra-prediction mode of the current block 303. In one embodiment, the target set of weightings $W_1$, $W_2$, and $W_3$ for averaging the prediction values $P_1$, $P_2$, and $P_3$ are determined according to rate-distortion optimization (RDO) costs corresponding to the predetermined weighting sets in the weighting table 500. For example, the intra-prediction module generates 9 sets of weightings corresponding to all 9 intra-prediction modes at step 412, and then averages the prediction values $P_1$, $P_2$, and $P_3$ according to all 9 sets of weightings to obtain 9 weighted-average prediction values, each corresponding to one intra-prediction mode. The weighted-average prediction values of all pixels of the current block are then aggregated to obtain 9 predicted blocks corresponding to 9 intra-prediction modes, RDO costs corresponding to the 9 predicted blocks are then calculated, and an output predicted block is selected from the 9 predicted blocks according to the RDO costs thereof. A number of bits are used to save the selected intra-prediction mode so corresponding decoders can be notified of which intra-prediction mode is being used.

The method 400 shown in FIG. 4 generates a predicted block composed of a plurality of weighted-average prediction values. The predicted block with weighted-average prediction values, however, may have a greater distortion than a predicted block obtained according to the original intra-prediction mode of the current block 303. The intra-prediction module of an embodiment therefore comprises a mechanism for automatically determining whether to generate a predicted block comprising the weighted-average prediction values according to the method 400. The overlapped block intra-prediction (OBIP) of this embodiment can be activated or deactivated at block (e.g. Macroblock MB) level. In one embodiment, after the weighted-average prediction values of all pixels of the current block and the third prediction values $P_3$ obtained according to the intra-prediction mode of the current block 303 are obtained, the intra-prediction module aggregates the weighted-average prediction values of all pixels of the current block to obtain a first predicted block, and aggregates the third prediction values $P_3$ of all pixels of the current block to obtain a second predicted block. The intra-prediction module then calculates a first rate-distortion optimization (RDO) cost of the first predicted block, and calculates a second RDO cost of the second predicted block. When the first RDO cost is higher than the second RDO cost, the second predicted block obtained according to the intra-prediction mode of the current block 303 is output as the prediction block to a subsequent subtraction module. When the first RDO cost is lower than the second RDO cost, the first predicted block is output as the prediction block to the subsequent subtraction module. In this embodiment, one bit is used to save information of whether OBIP is on or off for informing corresponding decoders.

Figure 6:
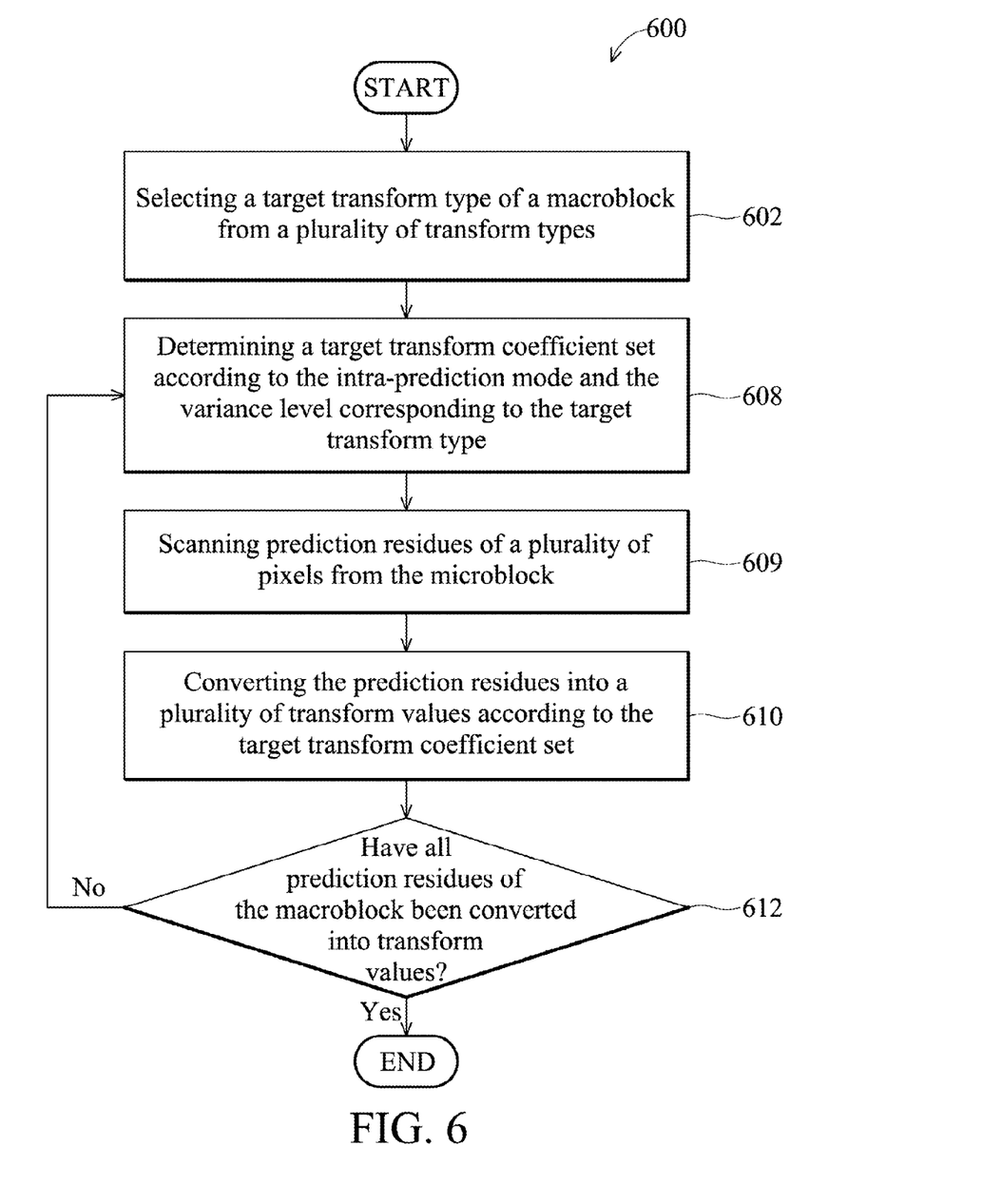
FIG. 6 is a flowchart of a method for performing video data compression according to an embodiment of the invention.

A subtraction module of a video encoder then subtracts prediction values of a predicted block from original pixel values of a target block to obtain prediction residues of the target block, the prediction residues of the target block are sent to a transform module for data compression. Referring to FIG. 6, a flowchart of a method 600 for performing video data compression according to the invention is shown. Assume that a transform module of a video encoder support a plurality of transform types, wherein each transform type corresponds to a variance level of prediction residues. The transform module first receives a macroblock having prediction residues to be compressed, and selects a target transform type of the macroblock from a plurality of transform types corresponding to the intra-prediction mode of the current macroblock (step 602). In one embodiment, the transform module computes a plurality of rate-distortion optimization (RDO) costs corresponding to the transform types, and selects the transform type with the lowest RDO cost as the target transform type.

Figure 7:
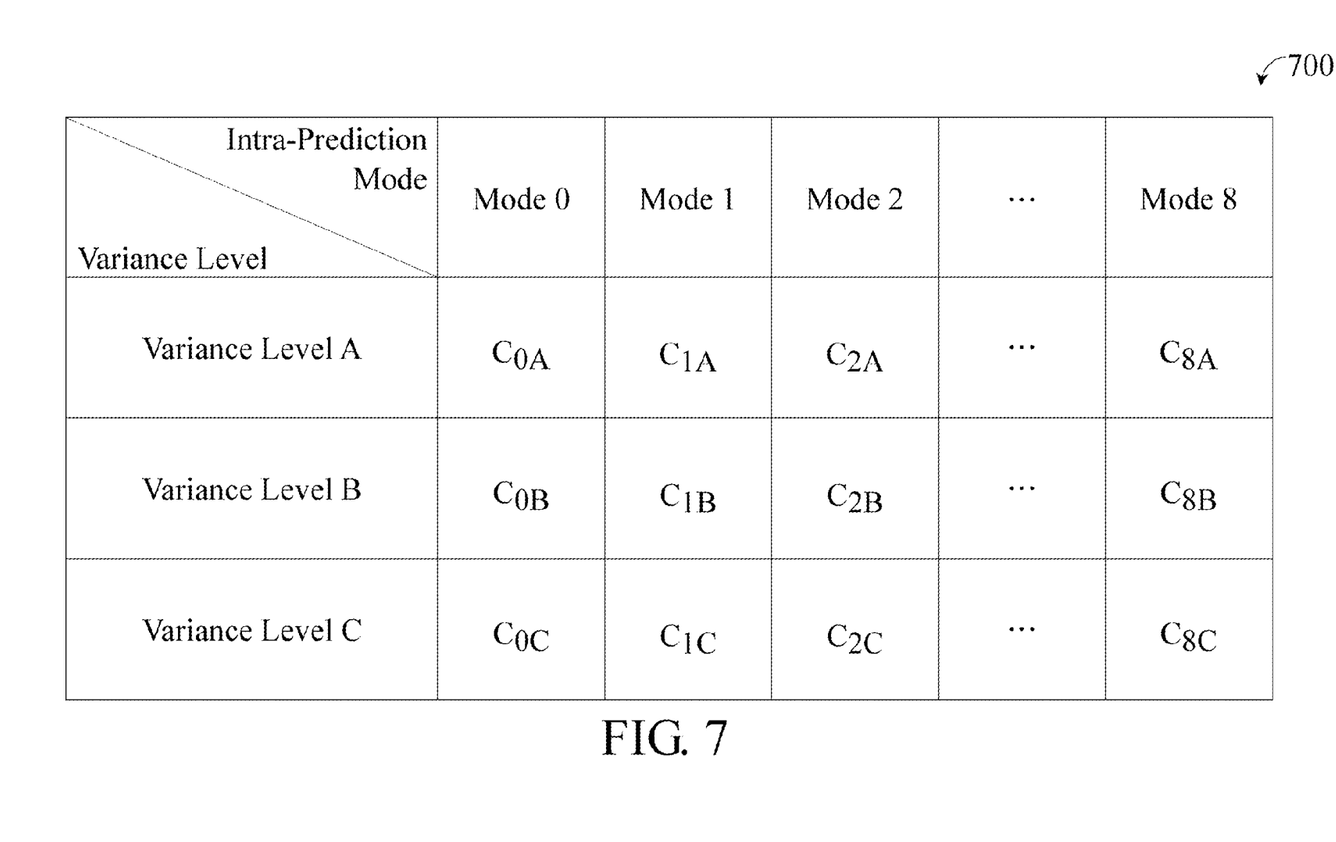
FIG. 7 is a schematic diagram of a transform coefficient table storing a plurality of transform coefficient sets according to an embodiment of the invention.

In some embodiments, transform types represent transforms with different transform coefficient sets. Some popular transform methods used in video coding include discrete cosine transform (DCT) and Karhunen Lòeve Transform (KLT). The transform coefficient sets are sorted according to intra-prediction modes and variance levels, where each transform coefficient set is composed of a plurality of predetermined transform coefficients. In one embodiment, the transform module stores a transform coefficient table storing the transform coefficient sets. Referring to FIG. 7, a schematic diagram of a transform coefficient table 700 storing a plurality of transform coefficient sets according to an embodiment of the invention is shown. The transform coefficient sets in the transform coefficient table 700 are indexed according to intra-prediction modes and variance levels. For example, a transform coefficient set $C_{0A}$ corresponds to a vertical intra-prediction mode 0 and a variance level A corresponding to a lowest residue variance level. A transform coefficient set $C_{8C}$ corresponds to a horizontal-up intra-prediction mode 8 and a variance level C corresponding to a highest residue variance level.

The transform module then determines a target transform coefficient set according to the intra-prediction mode and the variance level corresponding to the target transform type (step 608). In one embodiment, the transform module searches the transform coefficient table 700 for the target transform coefficient set according to the intra-prediction mode and the variance level. The transform module then scans prediction residues of a plurality of pixels (step 609), and converts the prediction residues into a plurality of transform values according to the target transform coefficient set (step 610). In one embodiment, the transform module determines a specific scanning order according to the transform type, and scans the pixels according to the specific scanning order to obtain the prediction residues. The transform module then repeats steps 604-612 until prediction residues of the macroblock are converted into transform values. Macroblocks corresponding to different intra-prediction modes are therefore compressed according to different transform types corresponding to the intra-prediction modes.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for performing intra-prediction, comprising:
   determining a first intra-prediction mode of a left block and a second intra-prediction mode of an up block, wherein the left block is on the left of a current block, and the up block is on top of the current block;
   selecting a target pixel from a plurality of pixels of the current block;
   calculating a first prediction value of the target pixel assuming that the current block is in the first intra-prediction mode;
   calculating a second prediction value of the target pixel assuming that the current block is in the second intra-prediction mode; and
   weighted-averaging the first prediction value and the second prediction value to obtain a weighted-average prediction value.

2. The method as claimed in claim 1, wherein weighted-averaging of the first prediction value and the second prediction value comprises:
   determining a target set of weightings according to the position of the target pixel in the current block; and
   weighted-averaging the first prediction value and the second prediction value according to the target set of weightings to obtain the weighted-average prediction value.

3. The method as claimed in claim 2, wherein the target set of weightings comprises a first weighting corresponding to the first prediction value and a second weighting corresponding to the second prediction value.

4. The method as claimed in claim 2, wherein the target set of weightings is determined according to an intra-prediction mode of the current block.

5. The method as claimed in claim 2, wherein the target set of weightings is determined by searching a weighting table according to the position of the target pixel in the current block.

6. The method as claimed in claim 2, wherein the target set of weightings is determined according to rate-distortion optimization costs corresponding to a plurality of predetermined weighting sets, and the predetermined weighting sets are for a plurality of intra-prediction modes.

7. The method as claimed in claim 1, wherein the method further comprises:
   repeating selection of the target pixel, calculation of the first and second prediction values, and weighted-averaging of the first and second prediction values until the weighted-average prediction values of all pixels of the current block are obtained;
   calculating third prediction values of the pixels in the current block according to an intra-prediction mode of the current block;
   aggregating the weighted-average prediction values of the pixels of the current block to obtain a first predicted block;
   aggregating the third prediction values of the pixels of the current block to obtain a second predicted block;
   computing a first rate-distortion optimization (RDO) cost of the first predicted block;
   computing a second RDO cost of the second predicted block;
   comparing the first RDO cost with the second RDO cost;
   outputting one of the first and second predicted blocks as an intra-prediction block based on the RDO cost comparison.

8. The method as claimed in claim 1, wherein the method further comprises:
   repeating selection of the target pixel, calculation of the first and second prediction values, and weighted-averaging of the first and second prediction values until the weighted-average prediction values of all pixels of the current block are obtained;
   aggregating the weighted-average prediction values of the pixels of the current block to obtain a predicted block;
   outputting the predicted block as an intra-prediction block.

9. A video encoder, receiving a current block, wherein a left block is on the left of the current block and an up block is on top of the current block, the video encoder comprising:
   an intra-prediction module, determining a first intra-prediction mode of the left block and a second intra-prediction mode of the up block, selecting a target pixel from a plurality of pixels of the current block, calculating a first prediction value of the target pixel assuming that the current block is in the first intra-prediction mode, calculating a second prediction value of the target pixel assuming that the current block is in the second intra-prediction mode, and weighted-averaging the first prediction value and the second prediction value to obtain a weighted-average prediction value as a prediction value of the target pixel; and
   a subtraction module, subtracting the prediction value from the target pixel to obtain a prediction residue of the target pixel.

10. The video encoder as claimed in claim 9, wherein the intra-prediction module determines a target set of weightings according to the position of the target pixel in the current block, and weighted-averages the first prediction value and the second prediction value according to the target set of weightings to obtain the weighted-average prediction value.

11. The video encoder as claimed in claim 10, wherein the target set of weightings comprise a first weighting corresponding to the first prediction value and a second weighting corresponding to the second prediction value.

12. The video encoder as claimed in claim 10, wherein the intra-prediction module determines the target set of weightings further according to an intra-prediction mode of the current block.

13. The video encoder as claimed in claim 10, wherein the intra-prediction module searches a weighting table for the target set of weightings according to the position of the target pixel in the current block.

14. The video encoder as claimed in claim 10, wherein the intra-prediction module stores a plurality of predetermined weighting sets corresponding to a plurality of intra-prediction modes, and the intra-prediction module determines the target set of weightings from the predetermined weighting sets according to rate-distortion optimization costs corresponding to the predetermined weighting sets.

15. The video encoder as claimed in claim 9, wherein the intra-prediction module repeats selection of the target pixel, calculation of the first and second prediction values, and weighted-averaging of the first and second prediction values until the weighted-average prediction values of all pixels of the current block are obtained, aggregates the weighted-average prediction values of the pixels of the current block to obtain a first predicted block, calculating third prediction values of the pixels of the current block according to an intra-prediction mode of the current block, aggregates the third prediction values of the pixels of the current block to obtain a second predicted block, computes a first rate-distortion optimization (RDO) cost corresponding to the first predicted block, computes a second RDO cost corresponding to the second predicted block, compares the first RDO cost with the second RDO cost, outputs the first or second predicted block to the subtraction module based on the RDO cost comparison.

16. The video encoder as claimed in claim 9, wherein the intra-prediction module repeats selection of the target pixel, calculation of the first and second prediction values, and weighted-averaging of the first and second prediction values until the weighted-average prediction values of all pixels of the current block are obtained, aggregates the weighted-average prediction values of the pixels of the current block to obtain a predicted block, and outputs the predicted block to the subtraction module.

17. A method for performing intra-prediction, comprising:
determining a first intra-prediction mode of a left block and a third intra-prediction mode of a current block, wherein the left block is on the left of the current block;
selecting a target pixel from a plurality of pixels of the current block;
calculating a first prediction value of the target pixel assuming that the current block is in the first intra-prediction mode;
calculating a third prediction value of the target pixel according to the determined third intra-prediction mode of the current block;
weighted-averaging the first prediction value and the third prediction value to obtain a weighted-average prediction value.

18. The method as claimed in claim 17, wherein weighted-averaging of the first prediction value and the third prediction value comprises:
determining a target set of weightings according to the position of the target pixel in the current block; and
weighted-averaging the first prediction value and the third prediction value according to the target set of weightings to obtain the weighted-average prediction value.

19. The method as claimed in claim 17, wherein the method further comprises:
repeating selection of the target pixel, calculation of the first and third prediction values, and weighted-averaging of the first and third prediction values until the weighted-average prediction values of all pixels of the current block are obtained;
aggregating the weighted-average prediction values of the pixels of the current block to obtain a predicted block;
outputting the predicted block as an intra-prediction block.

20. A video encoder, receiving a current block, wherein a left block is on the left of the current block, the video encoder comprising:
an intra-prediction module, determining a first intra-prediction mode of the left block and a third intra-prediction mode of the current block, selecting a target pixel from a plurality of pixels of the current block, calculating a first prediction value of the target pixel assuming that the current block is in the first intra-prediction mode, calculating a third prediction value of the target pixel according to the determined third intra-prediction mode of the current block, and weighted-averaging the first prediction value and the third prediction value to obtain a weighted-average prediction value as a prediction value of the target pixel; and
a subtraction module, subtracting the prediction value from the target pixel to obtain a prediction residue of the target pixel.

21. The video encoder as claimed in claim 20, wherein the intra-prediction module determines a target set of weightings according to the position of the target pixel in the current block, and weighted-averages the first prediction value and the third prediction value according to the target set of weightings to obtain the weighted-average prediction value.

22. The video encoder as claimed in claim 20, wherein the intra-prediction module repeats selection of the target pixel, calculation of the first and third prediction values, and weighted-averaging of the first and third prediction values until the weighted-average prediction values of all pixels of the current block are obtained, aggregates the weighted-average prediction values of the pixels of the current block to obtain a predicted block, and outputs the predicted block to the subtraction module.

23. A method for performing intra-prediction, comprising:
determining a second intra-prediction mode of an up block and a third intra-prediction mode of a current block, wherein the up block is on top of the current block;
selecting a target pixel from a plurality of pixels of the current block;
calculating a second prediction value of the target pixel assuming that the current block is in the second intra-prediction mode;
calculating a third prediction value of the target pixel according to the determined third intra-prediction mode of the current block;
weighted-averaging the second prediction value and the third prediction value to obtain a weighted-average prediction value.

24. The method as claimed in claim 23, wherein weighted-averaging of the second prediction value and the third prediction value comprises:

determining a target set of weightings according to the position of the target pixel in the current block; and weighted-averaging the second prediction value and the third prediction value according to the target set of weightings to obtain the weighted-average prediction value.

25. The method as claimed in claim 23, wherein the method further comprises:

repeating selection of the target pixel, calculation of the second and third prediction values, and weighted-averaging of the second and third prediction values until the weighted-average prediction values of all pixels of the current block are obtained;

aggregating the weighted-average prediction values of the pixels of the current block to obtain a predicted block;

outputting the predicted block as an intra-prediction block.

26. A video encoder, receiving a current block, wherein an up block is on top of the current block, the video encoder comprising:

an intra-prediction module, determining a second intra-prediction mode of the up block and a third intra-prediction mode of the current block, selecting a target pixel from a plurality of pixels of the current block, calculating a second prediction value of the target pixel assuming that the current block is in the second intra-prediction mode, calculating a third prediction value of the target pixel according to the determined third intra-prediction mode of the current block, and weighted-averaging the second prediction value and the third prediction value to obtain a weighted-average prediction value as a prediction value of the target pixel; and a subtraction module, subtracting the prediction value from the target pixel to obtain a prediction residue of the target pixel.

27. The video encoder as claimed in claim 26, wherein the intra-prediction module determines a target set of weightings according to the position of the target pixel in the current block, and weighted-averages the second prediction value and the third prediction value according to the target set of weightings to obtain the weighted-average prediction value.

28. The video encoder as claimed in claim 26, wherein the intra-prediction module repeats selection of the target pixel, calculation of the second and third prediction values, and weighted-averaging of the second and third prediction values until the weighted-average prediction values of all pixels of the current block are obtained, aggregates the weighted-average prediction values of the pixels of the current block to obtain a predicted block, and outputs the predicted block to the subtraction module.

* * * * *